United States Patent [19]

Krukonis

[11] 3,868,230

[45] Feb. 25, 1975

[54] TUNGSTEN SUBSTRATE FOR HIGH-STRENGTH HIGH-MODULUS FILAMENT

[75] Inventor: Val J. Krukonis, Lexington, Mass.

[73] Assignee: Avco Corporation, Cincinnati, Ohio

[22] Filed: Sept. 15, 1972

[21] Appl. No.: 289,747

[52] U.S. Cl......... 29/198, 75/DIG. 1, 117/DIG. 10, 117/135.1
[51] Int. Cl............................................. B23p 3/00
[58] Field of Search .. 313/345; 117/135.1, DIG. 10, 117/231; 252/515; 29/419, 198

[56] References Cited
UNITED STATES PATENTS

| | | | |
|---|---|---|---|
| 1,925,857 | 9/1933 | Van Liempt | 313/345 |
| 3,668,006 | 6/1972 | Higgins et al. | 117/DIG. 10 |

FOREIGN PATENTS OR APPLICATIONS

| | | | |
|---|---|---|---|
| 10,741 | 5/1891 | Great Britain | 117/DIG. 10 |
| 8,004 | 4/1910 | Great Britain | 252/515 |

OTHER PUBLICATIONS

Bueren Van, H.G., "Imperfections in Crystals," North–Holland Pub. Co. 1960, pp. 417–422.
Lubin, G., Editor, "Handbook of Fiberglass and Advanced Plastics Composites," Van Nostrand Reinhold Co. 1969, pp. 201–228
Bechtold et al., "Flow & Fracture Characteristics of Annealed Tungsten," Trans of the ASM, Vol. 46, 1954, pp. 397–408.
Forster et al., "The Effect of Brain Structure on the Fracture of Recrystallised Tungsten Wire," Jr. of the Less Common Metals, 20, 1970, pp. 315–325.
Heinz et al., "Bubble Strengthening–A New Materials Concept," Research Development, 7-1971, pp. 18–21.
Hanby et al., "Summary of the Sixteenth Refractory Composites Working Group Meeting," 10-1969 pp. 1–6,
Wawner, Jr.; F. E., "The Effect of Chemical Polishing on the Strength & Fracture Characteristics of Amorphous Boron Filaments," Boron Vol. 2 Prep., Prop. & Applications, Edited by Gaule, G. K. Plenum Press 1965, QD181 B1C6, pp. 283–300.
Gilbert, A., "Fracture Initiation in Group Via Metals," Jr. of the Less Common Metals 21, 1970, pp. 212–214.
Jones, R.C., "Fractography of Fiber Reinforced Metal Composites," Advanced Materials, Composites & Carbons, 1971, pp. 29–34, TP810.5 A3.

Primary Examiner—Alfred E. Smith
Assistant Examiner—Wm. H. Punter
Attorney, Agent, or Firm—Charles M. Hogan, Esq.; Abraham Ogman, Esq.

[57] ABSTRACT

The invention relates generally to the pyrolytic decomposition of high strength and high-modulus coatings such as boron and silicon carbide, on a tungsten filament substrate. Clean tungsten filament or a tungsten filament containing selected impurities or additives is used. Such impurities and additives do not include silicon and/or potassium.

3 Claims, No Drawings

TUNGSTEN SUBSTRATE FOR HIGH-STRENGTH HIGH-MODULUS FILAMENT

High-strength and high-modulus filaments are generally produced by means of a pyrolytic deposition process. A complete description of a pyrolytic deposition process is provided in U.S. Pat. Nos. 3,549,424, 3,556,836, 3,574,649 and others. Briefly, the process comprises passing a tungsten filament through a reactor. The portion of the filament within the reactor is intensely heated and the hot surface thereof is contacted with vaporized chemicals which may be compounds, metals, other elements alone, or which may be compounds of metals or other elements in combination with inert and/or other reaction gases. The vaporized chemicals react on contact with the hot surface of the tungsten filament. A reaction product is a deposit of a desired chemical element or compound on the heated wire or filament.

Boron trichloride and hydrogen are generally used to deposit elemental boron. Methyl trichlorosilane and methyl dichlorosilane are commonly used to deposit silicon carbide.

The tungsten filament universally used in prior art processes is a grade of tungsten filament used in preparing incandescent light bulbs. This grade of tungsten is commonly referred to as lamp grade tungsten. Lamp grade tungsten is formed by adding to "clean" or pure tungsten impurities and additives, also called dopants, in small percentages. These modify the basic clean tungsten properties to make the tungsten filament suitable for use in incandescent lamps. Additives are provided to increase strength to prevent sagging. Many of the additives are provided to inhibit grain growth to prevent recrystallization of clean tungsten at incandescent temperatures. Such impurities and additives may be used singly or in combination, generally in combination. Alkaline oxides, silica, thoria or alumina are common additives. Iron oxide, calcium oxide and sodium oxide are also used.

Although the tungsten filament substrate per se does not contribute significantly to the high-strength high-modulus of a fully developed filament, such as boron or silicon carbide filament, it has been determined that the composition of the tungsten substrate will effect the tensile strength of the coating. Certain additives within the tungsten filament act as a fracture nucleation site. The overwhelming perponderance of filament breaks occur at the sites containing an additive or dopant.

It is an object of the invention to provide a high-strength high-modulus filament using an inproved tungsten substrate.

It is another object of the invention to provide a very high-strength high-modulus filament using a clean or un-doped tungsten filament substrate or a substrate with impurities and dopants which do not include silicon and/or potassium.

It is yet another object of the invention to provide a very high-strength high-modulus filament using a tungsten substrate filament which contains additives that do not form fracture nucleation sites.

The novel features that are considered characteristic of the invention are set forth in the appended claims; the invention itself, however, both as to its organization and method of operation, together with additional objects and advantages thereof, will best be understood from the following description of a specific embodiment:

A large number of boron high-strength high-modulus filaments containing lamp grade tungsten filament substrate were tested in tension. The fracture faces of the filament were examined by optical microscopy and the flaw initiation site was seen to occur at a small spot of about 1 micron in size, located at the boron-tungsten interface. This interface is literally tungsten boride caused by the reaction of the first deposited layer of boron and the tungsten, but this fact is not believed to be significant. By means of electron beam micro probe analysis, the additives in the fracture nucleation site were identified. In each case, silicon was found to be present in high concentration at the fracture nucleation site. When high concentrations of silicon were present, potassium was also found to be present.

The fracture nucleation site within the tungsten filament substrate containing the high local concentrations of selected impurities or selected dopants experience stress concentrations when being coated, which induce fracture at strength materially below the theoretical strength of the coating. For example, the theoretical tensile strength of boron, 1,000 Ksi, yet boron filament with lamp grade tungsten breaks at 400 to 550 Ksi.

The fracture nucleation site in the example of a boron deposit on tungsten occurs in the tungsten boride interface. Where the coating does not react with the tungsten, the fracture nucleation site will occur at the interface of the substrate and the coating.

The tensile strength of boron and silicon carbide filaments, in particular, was greatly improved through the use of a clean (un-doped) tungsten substrate, i.e., a tungsten substrate containing no additives. For example, whereas 0.0005 inch diameter filaments containing lamp grade tungsten filament substrate break at about 400 – 550 Ksi, the average tensile strength of like diameter filaments containing clean or un-doped tungsten was 650 Ksi. Tensile strengths of individual pieces of such filaments were as high as 680 Ksi, indicating that the absence of dopants translated into a definite increase in tensile strength.

It is further theorized from the experimental data obtained that not all of the dopants used in lamp grade tungsten created fracture nucleation sites. As was pointed out previously in each and every fracture examined, the fracture nucleation site contained silicon and/or potassium.

A common dopant or additive used in lamp grade tungsten filament is silicon oxide. Since the pyrolytic deposition process is essentially a reduction process, it would appear that the silicon oxide deposit is converted to silicon during the deposition process.

Texts on this subject of tungsten do not indicate any source of potassium as a conventional dopant. The potassium may occur as a natural impurity in the tungsten or appear in the manufacturing process. For example, a well-known etchent for tungsten is potassium ferricynide.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A high strength high-modulus composite filament comprising:
   a pure tungsten filament substrate free of dopants on which is deposited a high-strength high-modulus coating taken from the class consisting essentially of boron and silicon carbide.

2. A high-strength, high-modulus composite filament comprising:
   a tungsten filament substrate formed from lamp grade tungsten that is free of silicon; and
   a coating on the tungsten filament of a high-strength, high-modulus material taken from the class consisting essentially of boron and silicon carbide.

3. A high-strength, high-modulus composite filament as defined in claim 2 where the filament is free of silicon and/or potassium.

* * * * *